(12) United States Patent
Calvert

(10) Patent No.: US 6,422,030 B1
(45) Date of Patent: Jul. 23, 2002

(54) PORTABLE EVAPORATIVE COOLER

(75) Inventor: Phillip D. Calvert, Center, TX (US)

(73) Assignee: General Shelters of Texas, S.B., Ltd., Center, TX (US)

( * ) Notice: Subject to any disclaimer, the term of this patent is extended or adjusted under 35 U.S.C. 154(b) by 0 days.

(21) Appl. No.: 09/819,173

(22) Filed: Mar. 27, 2001

(51) Int. Cl.[7] ............................................. F28D 5/00
(52) U.S. Cl. .......................................... 62/314; 62/310
(58) Field of Search ......................... 62/314, 304, 310, 62/298, 259.1; 261/105, 106, 3, 43

(56) References Cited

U.S. PATENT DOCUMENTS

| | | | |
|---|---|---|---|
| 1,983,979 A | | 12/1934 | Graham ............................ 98/2 |
| 2,237,497 A | | 4/1941 | Munford ........................ 261/29 |
| 2,493,141 A | | 1/1950 | Henry ............................ 62/140 |
| 2,796,014 A | | 6/1957 | Montgomery et al. ............. 98/2 |
| 2,983,212 A | | 5/1961 | Poole ................................ 98/2 |
| 3,273,867 A | | 9/1966 | Enblom .......................... 261/29 |
| 3,555,846 A | | 1/1971 | Harbeck et al. ................ 62/244 |
| 3,583,174 A | | 6/1971 | Logue ............................ 62/309 |
| 3,606,982 A | | 9/1971 | Anderson ...................... 261/29 |
| 4,360,368 A | | 11/1982 | Lyon ............................. 55/259 |
| 4,672,818 A | | 6/1987 | Roth .............................. 62/239 |
| 4,711,097 A | * | 12/1987 | Besik ............................. 62/271 |
| 4,835,982 A | | 6/1989 | Ferdows ........................ 62/239 |
| 4,926,656 A | * | 5/1990 | Hickley et al. ................ 62/310 |
| 4,953,831 A | * | 9/1990 | Albrecht ................... 261/105 X |
| 4,970,876 A | * | 11/1990 | Vnokurov ...................... 62/304 |
| 5,097,672 A | * | 3/1992 | Takenaka et al. .............. 62/186 |
| 5,112,535 A | | 5/1992 | Roberson et al. .............. 261/27 |
| D362,904 S | * | 10/1995 | Wulf et al. |
| 5,606,868 A | * | 3/1997 | Calvert ...................... 62/304 X |
| 5,857,350 A | * | 1/1999 | Johnson et al. ................ 62/314 |
| 6,182,463 B1 | * | 2/2001 | Strussion et al. .............. 62/314 |

OTHER PUBLICATIONS

Tools for Living, Kool Zone Air Cooler; http://www.tools-for-living.com/; Copyright 1999 The Magellan Group, Inc.*
Brochure entitled Cool Breeze:, Cool Enterprises, Inc.
Brochure entitled "Portable Evaporative Cooling"; Texas Mega–Breeze, Inc.
Jo Enterprises; *Beat the Heat with Golf Cool*; http://www.joenterprises.com/main.htm (http://www.joenterprises.com/golfcool.htm); 2 pages.
Brochure entitled "EssickAir Evaporative Coolers"; Grainger/3505.

* cited by examiner

*Primary Examiner*—Chen-Wen Jiang
(74) *Attorney, Agent, or Firm*—Locke, Liddell & Sapp LLP

(57) ABSTRACT

The present invention provides a portable evaporative cooler that is capable of being carried from location to location and readily used even in remote areas. The portable evaporative cooler contains one or more relatively small fans mounted in a case and having a water reservoir disposed below the fans. The cooling pad is mounted behind the fans and water is pumped across the cooling pads. One or more fans cause an air flow to pass the cooling pads and exit the evaporative cooler.

23 Claims, 3 Drawing Sheets

PORTABLE EVAPORATIVE COOLER

FIELD OF THE INVENTION

The invention relates generally to evaporative coolers and, more particularly, to portable evaporative coolers.

BACKGROUND OF THE INVENTION

The evaporative cooler has been a source of inexpensive cooling since the early 1900's. In general, an evaporative cooling unit includes a housing having a fan and one or more water saturated cooling pans mounted therein. The fan is designed to draw air through the housing and across the water saturated pads. The air is cooled by moisture evaporation as the air passes through the pads. Evaporative coolers are particularly suited for outdoor use, or applications where air conditioning is impractical or cost prohibitive. Typical applications include warehouses, aircraft hangars, auto repair shops, and gymnasiums. Further, prior to refrigerated air conditioning, some evaporative coolers were mounted horizontally in the roofs of cars or other vehicles. At least one known evaporative cooler is mounted horizontally in the roof of a golf cart.

However, the typical evaporative cooler is a large structure permanently fixed in position. The fan diameters typically are 24 to 36 inches and the weight is approximately 150 to about 500 pounds, depending on the size of the unit. Such designs are not conducive to portability. Prior to the present invention, it was believed that the utility of an evaporative cooler typically required the above sizes to conduct a sufficient air flow and cooling capacity. Thus, limited efforts were directed toward portability. One portable evaporative cooler resembles a typical "box" fan sold at discount stores and is powered by AC current. It appears to have a relatively large, centrally disposed fan.

Therefore, there remains a need for increased portability of evaporative coolers.

SUMMARY OF THE INVENTION

The present invention provides a portable evaporative cooler that is capable of being carried from location to location and readily used even in remote areas. The portable evaporative cooler contains one or more relatively small fans mounted in a case and having a water reservoir disposed below the fans. The cooling pad is mounted behind the fans and water is pumped across the cooling pads. One or more fans cause an air flow to pass the cooling pads and exit the evaporative cooler.

While such features may present an incremental step in the progress of the evaporative cooling fan technology, such features heretofore have not been available. Prior to the invention, those in the art of evaporative coolers were relegated to relatively large and nonportable or semi-portable evaporative coolers. The need for portability of evaporative coolers has been long felt and the technology may have existed to solve the need. However, those with ordinary skill of the art do not appreciate the appropriate solution offered by the present invention.

A portable evaporative cooler is provided, comprising a case and a water container coupled to the case, the case having a first edge with a length and a second edge with a length and wherein the lengths of the edges have a ratio that is at least about 1.5:1, exclusive of the water container, a cooling pad coupled to the case, and a DC operated fan adapted to connect to a battery for powering the fan, the evaporative cooler having a weight of about 25 pounds or less when the cooler is dry of cooling water.

Further, a portable evaporative cooler is provided, comprising a case, a water container coupled to the case, a cooling pad coupled to the case, and a DC operated fan adapted to connect to a battery for powering the fan.

The portable evaporative cooler further comprises a case, a water container coupled to the case, having a handhold molded into the container, a cooling pad coupled to the case, and a DC operated fan adapted to connect to a battery for powering the fan.

The portable evaporative cooler further comprises a case having an edge to thickness ratio of at least about 3:1, a water container coupled to the case, a cooling pad coupled to the case, and a DC operated fan adapted to connect to a battery for powering the fan.

BRIEF DESCRIPTION OF THE DRAWINGS

A more particular description of the invention, briefly summarized above, may be had by reference to the embodiments thereof which are illustrated in the appended drawings and described herein. It is to be noted, however, that the appended drawings illustrate only some embodiments of the invention and are therefore not to be considered limiting of its scope, because the invention may admit to other equally effective embodiments.

DETAILED DESCRIPTION OF THE DRAWINGS

Figure 2:
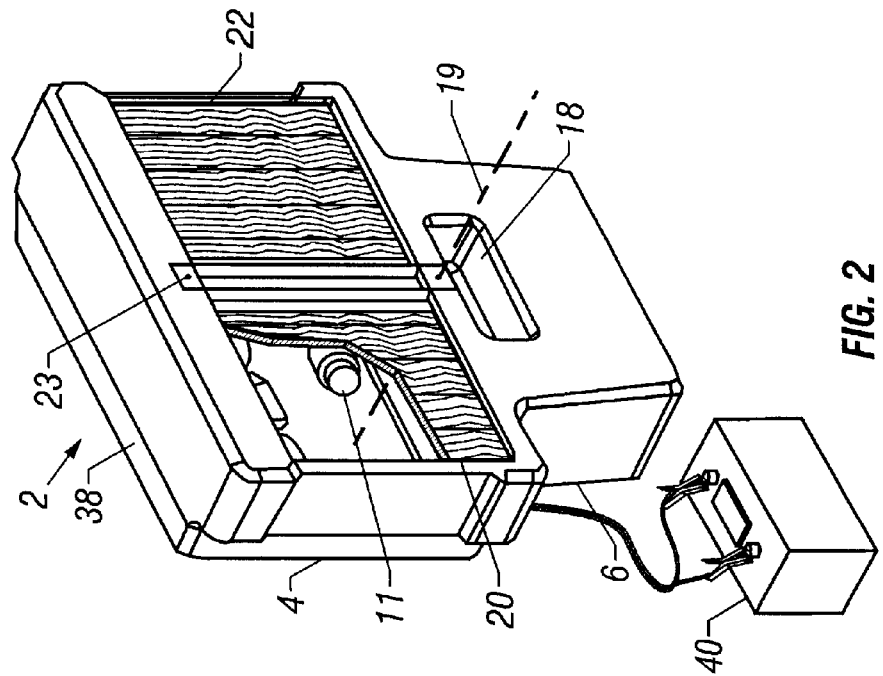
FIG. 2 is schematic perspective rear view of the portable evaporative cooler shown in FIG. 1.
Figure 1:
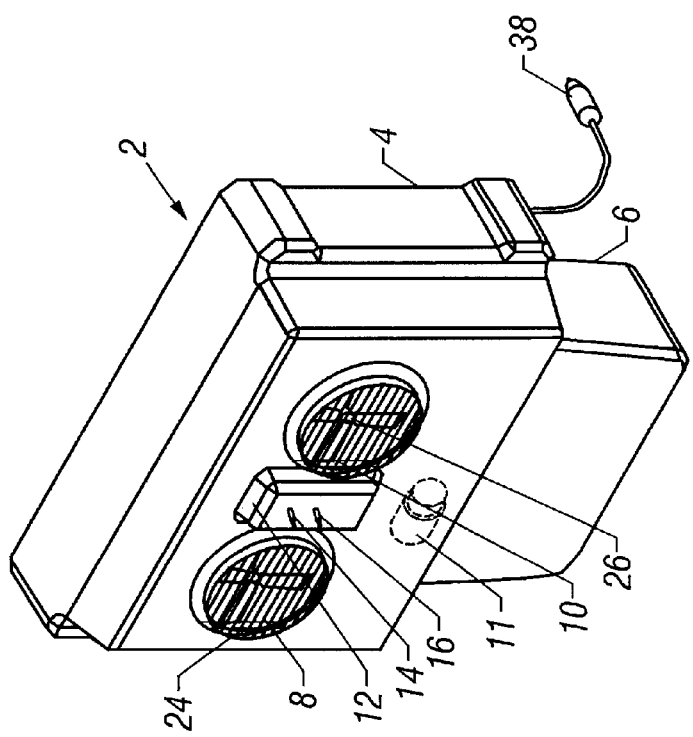
FIG. 1 is schematic perspective front view of one embodiment of a portable evaporative cooler.

FIG. 1 is schematic perspective front view of one embodiment of a portable evaporative cooler. FIG. 2 is schematic perspective rear view of the portable evaporative cooler shown in FIG. 1. The figures will be described in conjunction with each other and items are similarly numbered. One evaporative cooler is described in U.S. Pat. No. 6,223,548 and is incorporated herein by reference. It should also be realized that the exemplary evaporative cooler shown herein can be modified in many respects and is representative of a portable evaporative cooler limited only by the claims contained herein.

An evaporative cooler 2 can include a case 4, a water container 6, one or more fans 8, 10 mounted in the case, and one or more cooling pads 20, 22. The case is typically formed of an outer thin shell which provides an interior volume for mounting components of the evaporative cooler 2. In one embodiment, the case 4 and the water container 6 are integral. They can be formed as an integral structure in, for example, a mold. The case can be relatively narrow and still allow air flow to pass across the cooling pads in a somewhat distributed manner.

In one embodiment, the case 4 can form a rectangle, although it is to be understood that other geometric shapes can be formed, such as squares, circles, ellipses, and other polygons. The case 4 can be formed of a corrosion resistant material such as a plastic. Without limitation and merely for exemplary purposes, such plastics can include PVC, polypropylene, polyurethane, and other structural materials. Furthermore, metals and nonmetals can be used to form the case 4. The water container is a leak-resistant, relatively thin shell which forms an internal volume in which the water can be temporarily stored. The water container 6 can be made of similar materials as the case 4.

In at least one embodiment, the water container 6 is disposed below the case 4. Generally, the cooling fluid is a water. For the purposes herein, "water" will be referred to generically to include any cooling fluid that is used in an evaporative cooler. A pump 11 can be disposed adjacent or in the water container for pumping the water throughout the cooling pads 20, 22.

The evaporative cooler can use one or more fans 8, 10 to move air through the cooler. The fan can include metallic or nonmetallic fan blades. Uniquely, for an evaporative cooler, the fan can be relatively small, such as less than about 6 inches in diameter, although other sizes may be suitable.

One or more screens may be coupled to the case 4 adjacent the fans 8, 10. For example, a screen 24 or other protector may be used to shield the fan 8 from objects and for the safety of the operator. Similarly, a screen 26 or other protector can be used for the fan 10.

A plug 38 can be used to couple the evaporative cooler 2 to remote sources of power. In some embodiments, evaporative cooler 2 can be operated as a direct current (DC) unit. The evaporative cooler can be coupled to a cigarette lighter or other receptacle (not shown). In other embodiments, the power can be transported with the evaporative cooler 2. For example, a power supply 40, such as a battery, solar panel, or other energy source, can be included with the evaporative cooler. The power supply 40 can be coupled to the case 4, making a self-contained portable evaporative cooler.

In other embodiments, the fan(s) can use alternating current (AC). For example, the plug 38 can be an AC plug adapted to fit into an AC receptacle (not shown). Such current can be provided even at remote locations by portable power equipment, such as generators, or by more traditional power sources, such as household receptacles in areas such as garages, workshops, and other locations.

The evaporative cooler 2 can also include one or more switches to operate equipment contained therein. For example, a switch box 12 can be disposed on the evaporative cooler 2. The switch box 12 can include one or more switches, such as a fan switch 14 to operate the one or more fans. Further, the switch box 12 can include a pump switch 16 to operate one or more pumps for the cooling fluid. The switches 14, 16 can be any variety of on/off switches, including toggle switches, push button switches, optical sensors, and other methods of activating a powered device.

The water container 6 may have a handhold 18 formed within the water container and opened to an exterior area. The handhold can assist in transporting the evaporative cooler. The handhold can be formed in the water container in several positions. One position may be advantageously disposed even with or below an axis 19 passing through a center of gravity of the evaporative cooler 2. Such a position may assist in stabilizing the evaporative cooler as it is transported to various locations.

One or more cooling pads 20, 22 can be disposed in the evaporative cooler 2. In at least one embodiment, the water container can carry about 2 gallons, although the amount can vary. This quantity may be suitable for supplying water to the cooling pads 20, 22. The thickness of the pad can be a variety of thicknesses. In at least one embodiment, the pad is approximately 4 inches, which is designed to fit into a relatively narrow case. The thickness of the pad can vary and is dependent upon the available volume in the case 4 and desired air flow and efficiency through the cooling pad. The cooling pad can be made from sheets of paper, such as Kraft® paper, that are impregnated with a stiffening compound, such as a phenolic resin. The sheets can be corrugated to form a wavy surface, cured, and then glued to other sheets so that passages are formed between layers of the sheets. The sheets are then cut to a variety of shapes. Such cooling pads are made by General Shelters of Texas, S. B., Ltd. of Center, Texas, the assignee of this invention.

A pad spacer 23 can be disposed between the cooling pads 20, 22. The pad spacer may assist in structurally supporting the cooling pads. Further, the pads can assist in sealing voids between the cooling pads, so that entering air is forced through the cooling pad(s).

Portability is a desired feature of the present invention. In at least one embodiment, the weight of the evaporative cooler 2 excluding water and the battery is about 25 pounds or less. The weight can vary and is balanced by comparing the portability to the desired cooling ability.

Figure 3:
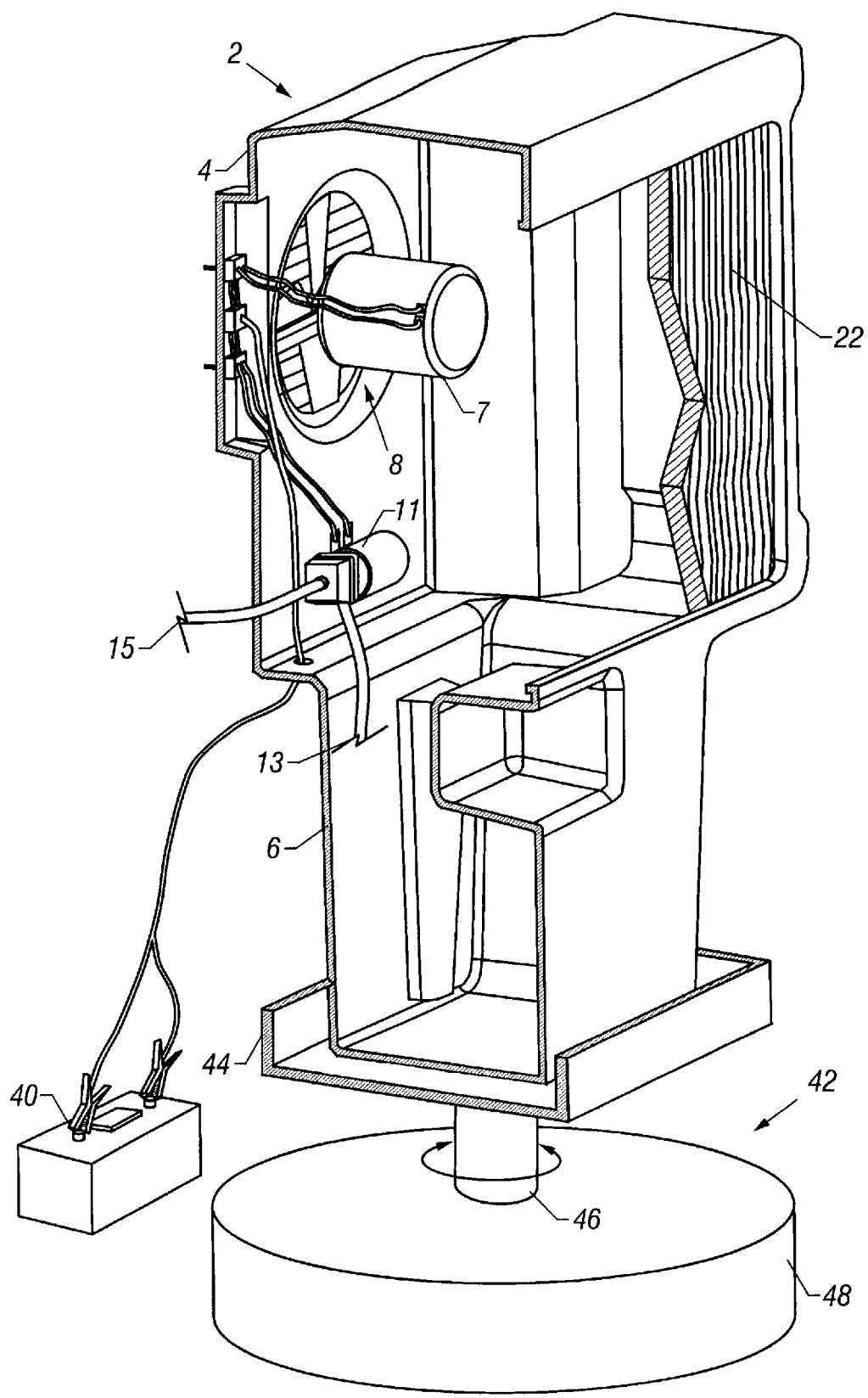
FIG. 3 is a cross-sectional schematic view of the evaporative cooler.

FIG. 3 is a cross-sectional schematic view of the evaporative cooler. The pump 11 can be located in several positions throughout the evaporative cooler system. One portion is inside the case 4. The pump 11 includes an inlet 13 and outlet 15. The inlet 13 can be coupled to the water container 6 so that the pump 11 can pump the water from the inlet 13 to the outlet 15 and into a manifold (not shown) for the cooling pad(s), such as cooling pad 22.

The pump 11 can be a positive displacement pump with a suction head sufficient to draw water even when not submerged in the water. Without limitation and merely as one example, the pump can be a diaphragm type with a motor to drive the pump. The motor is generally a fractional horsepower motor less than about one-quarter horsepower. The pump 11 and its associated motor can be wired to the switch box 12 and the pump switch 16 for operation thereof.

Similarly, the fans 8, 10 include motors 7, 9 respectively. The motors can be wired to the switch box 12 and the fan switch 14. In at least one embodiment, the fan blades include plastic materials that resist corrosion under heated conditions.

In operation, the portable cooler 2 can be placed in a desired location, including remote locations. The portable cooler can be readily transported because of its size and relative weight, in stark contrast to prior units. The evaporative cooler 2 can be activated by actuating the switch 14 for the fan and the switch 16 for the pump. At times, it may be desired to activate just the fan 10 and not the pump 11. The water container 6 can be placed in a holder (not shown), such as a golf cart basket typically disposed behind seats of a golf cart. The position of the evaporative cooler 2 allows the cooler to blow air onto one or more golfers seated in the golf cart.

The portable unit can be a free-standing unit that can also be set on any suitable surface, such as tables, lawns, chairs, and so forth. If the power supply 40 is directly coupled to the evaporative cooler, then the evaporative cooler 2 can be operated thereby. If the evaporative cooler 2 requires separate power, then the plug 38 can be attached to the separate supply and the cooler operated thereby.

The pump 11 supplies water typically through a manifold (not shown) to the cooling pads 20, 22. The water is distributed across the surfaces of the cooling pads 20, 22. The fans 8, 10, cool or otherwise provide air through the cooling pads 20, 22, so that the air is moisturized. The moisturized air is exhausted from the evaporative cooler 2 to provide the cooling.

In some embodiments, the evaporative cooler 2 can include an oscillator 42. The oscillator 42 can allow the evaporative cooler 2 to rotate through an arc that assists in directing air flow from the one or more fans 8, 10. The oscillator 42 can be formed integral to or partly coupled with the evaporative cooler 2 and is considered herein a part of the cooler. For example, the oscillator 42 can include a base 44 upon which the evaporative cooler 2 can rest or otherwise be coupled to the evaporative cooler 2. The base 44 can be coupled to a shaft 46 which is coupled to a motor 48. The motor 48 and any associated gearing or gear box can rotate the evaporative cooler 2 through at least a portion of a circular arc. The oscillator can reverse the motion through the arc, so that the evaporative cooler rotates back to an initial position. Alternatively, the oscillator 42 can continue rotation of the evaporative cooler 2 through one or more full circles.

The evaporative cooler 2 in the present invention can include a variety of advantageous height to width ratios, edge to thickness ratios, and other dimensional qualities. Advantageously, these dimensional qualities have heretofore have gone unnoticed to those with ordinary skill in the art to provide a portable evaporative cooler of the type described herein. The shape and dimensional qualities of the present invention are described in reference to FIGS. 4–6.

Figure 4:
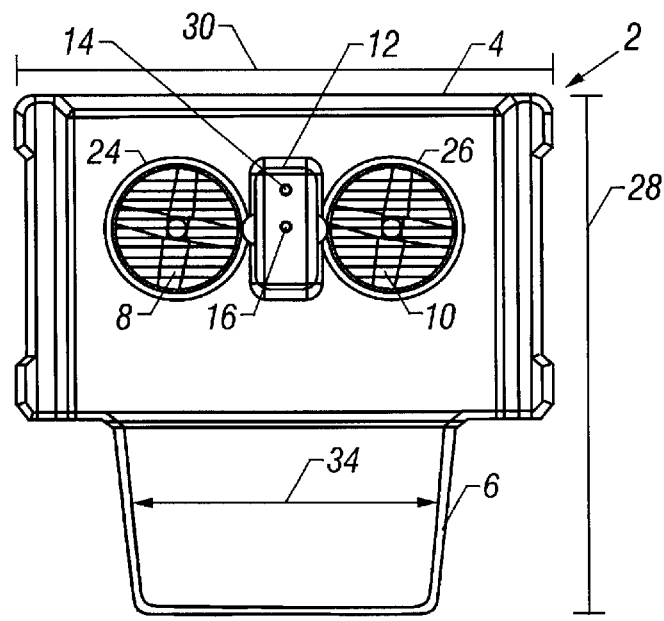
FIG. 4 is a schematic front view of the portable evaporative cooler.

FIG. 4 is a schematic front view of the portable evaporative cooler. Similar elements described in FIGS. 1–3 are similarly labeled in FIG. 4. The evaporative cooler 2 includes the case 4 and the water container 6. The water container 6 may be integrally formed with the case 4. One or more fans 8, 10 can be disposed in the evaporative cooler 2, such as in the case 4. Each fan can include a protective screen 24, 26, respectively. The cooler also includes a switch box 12, with associated switches, such as a fan switch 14 and a pump switch 16. In at least one embodiment, the case 4 is a rectangularly shaped object having a first length along an edge 28 and a second length along edge 30. In at least one embodiment, the ratio of the edge lengths are at least about one and one-half to one (1.5:1), exclusive on the water container 6. For example, the edge 30 could be about 1.5 times longer than the edge 28. Conversely, the edge 28 could be about 1.5 times longer than the edge 30. A plurality of fans 8, 10 can advantageously be mounted in alignment with the longer dimension, whether the longer edge is edge 28 or edge 30.

Further, the water container 6 can include a reduced cross section. For example, a width 34 of the water container 6 can be less than the length of the edge 30 of the case 4.

Figure 5:
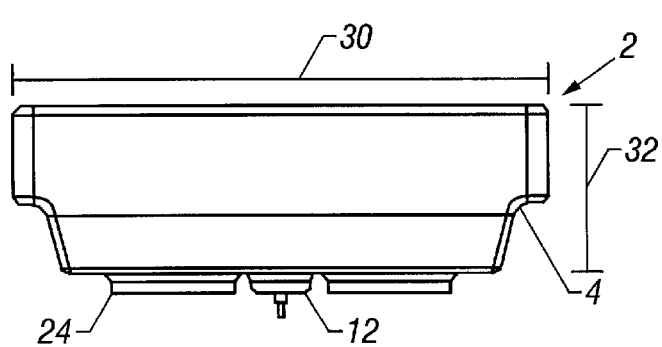
FIG. 5 is a schematic top view of the portable evaporative cooler.

FIG. 5 is a schematic top view of the portable evaporative cooler 2. The cooler 2 can include a case 4 having an edge 30 and a thickness 32. The thickness 32 can be advantageously narrow for portability and storability. For example, the ratio of the edge 30 to the thickness 32 can be about 3:1 or more. Alternatively, the edge 28, shown in FIG. 4, can have the same or similar ratio to the thickness 32 as the edge 30. Other ratios are possible and the above ratios are merely exemplary of some ratios that can be used for the case 4.

The narrowness of thickness 32 can cause difficulties. A transition from the wider dimensions of the cooling pads to a circumference of a fan within the short distance of thickness 32 can cause air turbulence and other air restrictions that can impede an air flow through the evaporative cooler 2. Thus, in at least one embodiment, the evaporative cooler 2 uniquely includes a plurality of fans such as the fans 8, 10, described herein. A plurality of fans allows the air flow to flow across different portions of the pad and to be more uniformly distributed across the face of the cooling pads 20, 22, shown in FIG. 2. Thus, the abruptness of transition between the cooling pads and the fan in such a narrow case can be reduced.

Figure 6:
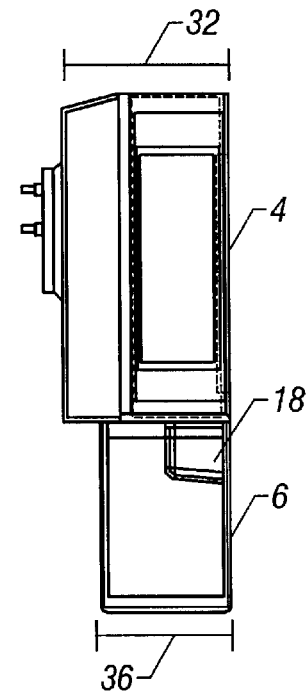
FIG. 6 is a schematic side view of the portable evaporative cooler.

FIG. 6 is a schematic side view of the portable evaporative cooler. The evaporative cooler 2 includes the case 4 and the water container 6. The case 4 has a thickness 32 and the water container 6 has a thickness 36. The thickness 36 can be reduced in dimension from the thickness 32 so that the cross section is reduced. Alternatively, the thickness 36 could be larger than the thickness 32.

Further, a handhold 18 can be formed in the water container 6. Alternatively, the handhold 18 or other handholds can be formed in the case 4 or other appropriate locations.

While the foregoing is directed to various embodiments of the present invention, other and further embodiments may be devised without departing from the basic scope thereof. For example, the various methods and embodiments of the invention can be included in combination with each other to produce other variations of the disclosed methods and embodiments. Also, the directions such as "over," "under", "side," "top," "bottom," "left," "right," "upper," "lower," and other directions and orientations are described or shown herein for clarity in reference to the figures and are not to be limiting of the actual device or use of the device as the device may be used in a number of directions and orientations. Further, the order of steps disclosed or claimed can be varied unless specifically stated otherwise.

What is claimed is:

1. A portable evaporative cooler, comprising:

a) a case;

b) a water container coupled to the case;

c) a cooling pad coupled to the case; and d) a DC operated fan adapted to connect to a battery for powering the fan, the DC operated fan comprising two fans disposed adjacent to each other and mounted side-by-side in the case.

2. The cooler of claim 1, further comprising a battery coupled to the fan.

3. The cooler of claim 2, wherein the battery is disposed at least partially within the case.

4. The cooler of claim 2, further comprising a handhold molded into the water container.

5. The cooler of claim 1, further comprising an oscillator coupled to the cooler.

6. The cooler of claim 1, wherein at least a portion of the water container comprises a cross section that is reduced in size compared to an average cross section of the case.

7. The cooler of claim 1, wherein the case defines at least one edge having a length and a thickness having a length and the edge to thickness ratio is least about 3:1.

8. The cooler of claim 1, wherein the case has a first edge having a length and a second edge having a length and wherein the lengths of the edges have a ratio that is at least about 1.5:1, exclusive of the water container.

9. The cooler of claim 1, wherein the water container is formed integral with the case.

10. The cooler of claim 1, wherein the cooler has a weight of about 25 pounds or less when the cooler is dry of cooling water.

11. A portable evaporative cooler, comprising:
a) a case;
b) a water container coupled to the case, having a handhold molded into the container;
c) a cooling pad coupled to the case; and
d) a DC operated fan adapted to connect to a battery for powering the fan, the DC operated fan comprising two fans disposed adjacent to each other and mounted side-by-side in the case.

12. The cooler of claim 11, further comprising a battery coupled to the fan.

13. The cooler of claim 11, wherein at least a portion of the water container comprises a reduced cross section compared to an average cross section of the case.

14. A portable evaporative cooler, comprising:
a) a case that defines at least one edge having a length and a thickness having a length and the edge to thickness ratio is least about 3:1;
b) a water container coupled to the case;
c) a cooling pad coupled to the case; and
d) a DC operated fan adapted to connect to a battery for powering the fan, the DC operated fan comprising two fans disposed adjacent to each other and mounted side-by-side in the case.

15. The cooler of claim 14, wherein the case has a first edge having a length and a second edge having a length and wherein the lengths of the edges have a ratio that is at least about 1.5:1, exclusive of the water container.

16. A portable evaporative cooler, comprising:
a) a case and a water container coupled to the case, the case having a first edge with a length and a second edge with a length and wherein the lengths of the edges have a ratio that is at least about 1.5:1, exclusive of the water container;
b) a cooling pad coupled to the case; and
c) a DC operated fan adapted to connect to a battery for powering the fan, the DC operated fan comprising two fans disposed adjacent to each other and mounted side-by-side in the case and the evaporative cooler having a weight of about 25 pounds or less when the cooler is dry of cooling water.

17. The cooler of claim 16, further comprising a battery coupled to the fan.

18. The cooler of claim 16, wherein at least a portion of the water container comprises a reduced cross section compared to an average cross section of the case.

19. The cooler of claim 16, wherein case defines at least one edge having a length and a thickness having a length and the edge to thickness ratio is least about 3:1.

20. A portable evaporative cooler, comprising:
a) a case;
b) a water container integrally formed with the case;
c) a cooling pad coupled to the case; and
d) a DC operated fan adapted to connect to a battery for powering the fan, the DC operated fan comprising two fans disposed adjacent to each other and mounted side-by-side in the case.

21. The cooler of claim 20, further comprising a battery coupled to the fan.

22. The cooler of claim 20, wherein at least a portion of the water container comprises a cross section that is reduced in size compared to an average cross section of the case.

23. The cooler of claim 20, wherein the cooler has a weight of about 25 pounds or less when the cooler is dry of cooling water.

* * * * *